(12) United States Patent
Lohrentz

(10) Patent No.: US 12,527,256 B2
(45) Date of Patent: Jan. 20, 2026

(54) CORN HEAD ROW UNITS, DECK PLATES FOR CORN HEAD ROW UNITS, AND HARVESTING HEADERS HAVING SUCH ROW UNITS

(71) Applicant: AGCO Corporation, Duluth, GA (US)

(72) Inventor: Randall Lohrentz, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 750 days.

(21) Appl. No.: 17/816,610

(22) Filed: Aug. 1, 2022

(65) Prior Publication Data
US 2024/0032470 A1    Feb. 1, 2024

(51) Int. Cl.
*A01D 45/02*     (2006.01)

(52) U.S. Cl.
CPC .................................. *A01D 45/021* (2013.01)

(58) Field of Classification Search
CPC ... A01D 45/02–45/028; A01D 43/081–43/083
See application file for complete search history.

(56) References Cited

U.S. PATENT DOCUMENTS

| | | | |
|---|---|---|---|
| 5,878,561 A * | 3/1999 | Gunn | A01D 45/023 56/119 |
| 8,402,727 B2 * | 3/2013 | Carboni | A01D 45/021 56/60 |
| 9,867,335 B1 * | 1/2018 | Obbink | A01D 45/021 |
| 10,334,784 B2 * | 7/2019 | Ricketts | A01D 45/023 |
| 11,324,166 B2 * | 5/2022 | Hallale | A01D 67/00 |
| 11,582,904 B2 * | 2/2023 | Walker | A01D 45/021 |
| 2003/0172639 A1 | 9/2003 | Calmer | |
| 2012/0029757 A1 * | 2/2012 | Kowalchuk | A01D 45/021 701/34.2 |
| 2012/0042619 A1 | 2/2012 | Lohrentz et al. | |
| 2013/0283749 A1 * | 10/2013 | Adamczyk | A01D 45/023 198/814 |
| 2014/0150394 A1 | 6/2014 | Calmer | |
| 2016/0113199 A1 * | 4/2016 | Jongmans | A01D 41/1273 56/10.2 R |
| 2016/0143217 A1 * | 5/2016 | Lohrentz | A01D 34/015 56/101 |
| 2016/0278290 A1 | 9/2016 | Vandergucht et al. | |

(Continued)

FOREIGN PATENT DOCUMENTS

| | | |
|---|---|---|
| CN | 104472103 A | 4/2015 |
| CN | 106068915 A | 11/2016 |

OTHER PUBLICATIONS

UK Intellectual Property Office, Search report for related UK Application No. GB2004248.7, dated Sep. 18, 2020.

(Continued)

*Primary Examiner* — Joseph M Rocca
*Assistant Examiner* — Madeline I Runco

(57) ABSTRACT

A row unit for a corn header includes gathering chains, deck plates below the gathering chains, and rotatable stalk rolls below the deck plates. The deck plates each have a first portion defining a curved front edge and a second portion defining a straight inner edge, and the first portion of the first deck plate is raised with respect to the second portion of the first deck plate. The inner edges of the deck plates together define an elongate channel, and the curved front edges of the deck plates together define a tapered entry to the elongate channel.

14 Claims, 6 Drawing Sheets

(56) References Cited

U.S. PATENT DOCUMENTS

| | | |
|---|---|---|
| 2017/0164555 A1 | 6/2017 | Gengerke |
| 2017/0238467 A1 | 8/2017 | Gessel et al. |
| 2018/0054960 A1 | 3/2018 | Gessel et al. |
| 2020/0178465 A1* | 6/2020 | Crow .................. A01D 43/083 |
| 2020/0260647 A1* | 8/2020 | Roemke ............... A01D 45/023 |

OTHER PUBLICATIONS

Korean Intellectual Property Office, International Search Report related to International Patent Application No. PCT/IB2020/057362, mail date Oct. 13, 2020.

\* cited by examiner

CORN HEAD ROW UNITS, DECK PLATES FOR CORN HEAD ROW UNITS, AND HARVESTING HEADERS HAVING SUCH ROW UNITS

CROSS-REFERENCE TO RELATED APPLICATION

This application is a national phase entry under 35 U.S.C. § 371 of International Patent Application PCT/IB2020/057362, filed Aug. 4, 2020 designating the United States of America and published in English as International Patent Publication WO 2021/156657 A1 on Aug. 12, 2021, which claims the benefit of the filing date of U.S. Provisional Patent Application 62/970,416, "Corn Head Row Units, Deck Plates for Corn Head Row Units, and Harvesting Headers Having Such Row Units," filed Feb. 5, 2020, the entire disclosure of which is incorporated herein by reference.

FIELD

Embodiments of the present disclosure relate to harvesting equipment. More particularly, embodiments of the present invention relate to harvesting headers having corn head row units.

BACKGROUND

Agricultural harvesters such as combines are typically equipped with a harvesting header. For instance, corn headers are specifically designed to pick up corn, and vary in size (e.g., two row units, twelve row units, etc.). As the harvester moves through the field, each row unit travels along and harvests a row of corn. Corn header row units typically use gathering chains or other mechanisms to convey plant material and ears rearward toward a cross auger (or, the gathering chains may simply guide the stalks toward the cross auger as the harvester advances in the field). A set of driven stalk rolls, which may rotate based on an input from the harvester, grabs the corn stalks and forces them downward between stripper plates. The ears of corn are snapped free of the stalk and conveyed by the gathering chains toward the cross auger. The cross auger passes the ears of corn to the feeder housing of the harvester.

In certain harvesting conditions, stalks can plug the entry area of row units prior to being engaged by the stalk rolls. For example, if when a gathering chain lug grabs a stalk and pulls it rearward, the stalk bends over, the stalk may become lodged in a gap between the gathering chain and stripper plate. Additional stalks can rapidly clog the row unit, and may require an operator to stop harvesting to clear a clog in one row unit.

BRIEF SUMMARY

In some embodiments, a row unit for a corn header includes a pair of gathering chains, a pair of deck plates below the gathering chains, and a pair of rotatable stalk rolls below the deck plates. Each gathering chain carries a plurality of gathering chain lugs, and the gathering chains are oriented such that the gathering chain lugs travel along parallel paths between the gathering chains when the gathering chains travel along paths. A first deck plate has a first portion defining a curved front edge and a second portion defining a straight inner edge, and the first portion of the first deck plate is raised with respect to the second portion of the first deck plate. A second deck plate has a first portion defining a curved front edge and a second portion defining a straight inner edge, and the first portion of the second deck plate is raised with respect to the second portion of the second deck plate. The inner edge of the first deck plate and the inner edge of the second deck plate together define an elongate channel, and the curved front edge of the first deck plate and the curved front edge of the second deck plate together define a tapered entry to the elongate channel. The stalk rolls are oriented parallel to the paths along which the gathering chain lugs travel between the gathering chains.

A harvesting header may include a plurality of row units carried by a frame.

In some embodiments, a set of deck plates includes a first deck plate having a first portion defining a curved front edge and a second portion defining a straight inner edge, and a second deck plate having a first portion defining a curved front edge and a second portion defining a straight inner edge. The first portion of the first body is raised with respect to the second portion of the first body, and the first portion of the second body is raised with respect to the second portion of the second body. The curved front edges of the first and second deck plates together define a converging lead-in area and the straight inner edges of the first and second deck plates together define an elongate channel trailing the lead-in area, such that when the set of deck plates is installed in a row unit, a vertical channel is formed between a pair of gathering chains, the deck plates, and a pair of stalk rolls.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
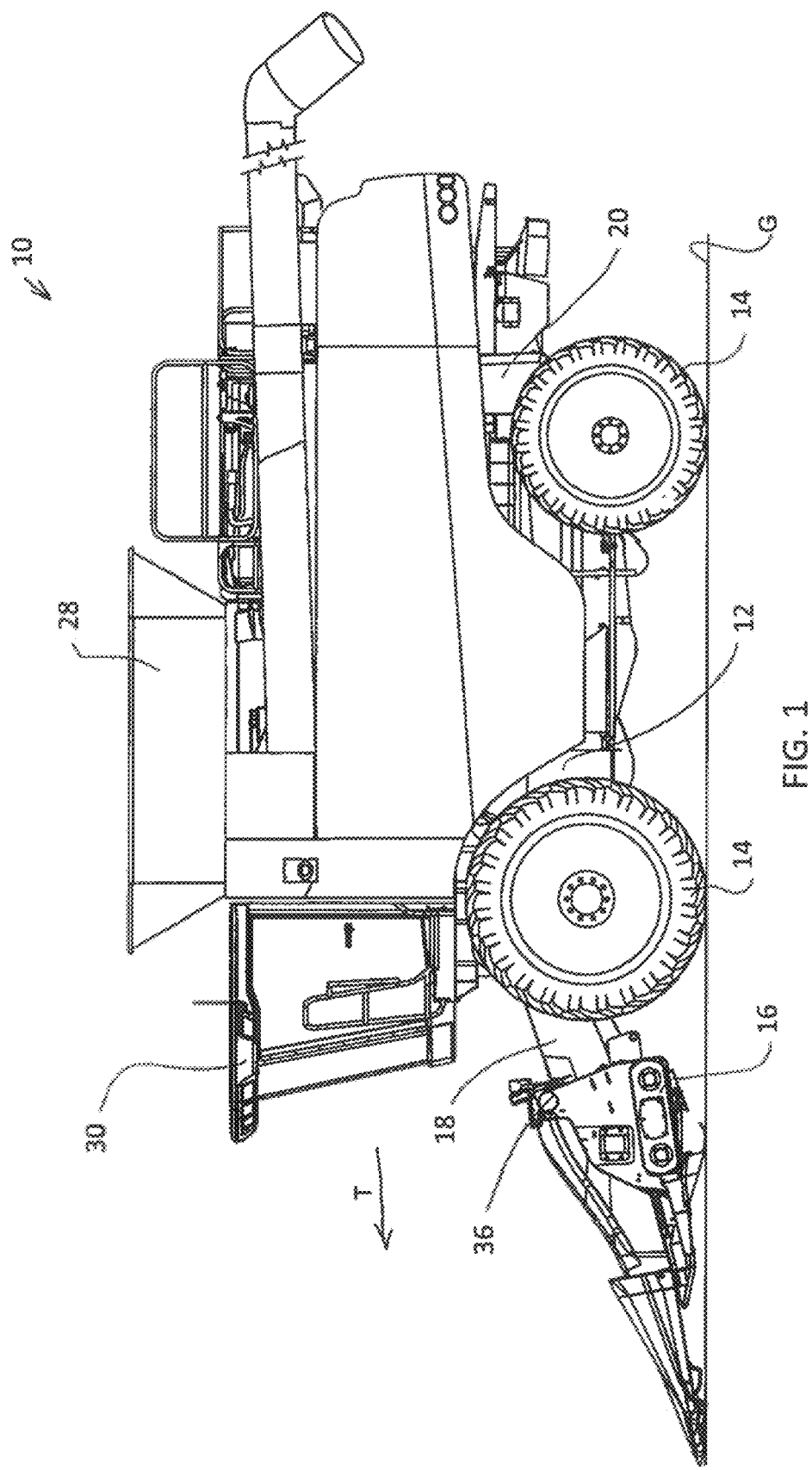
FIG. 1 is a simplified side elevation view of a combine harvester and harvesting header.

The illustrations presented herein are not actual views of any combine harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an agricultural combine 10, which includes a chassis 12 supported and propelled along the ground G by ground-engaging wheels 14. Although the combine 10 is illustrated as being supported and propelled on ground-engaging wheels 14, the combine 10 can also be supported and propelled by full tracks or half tracks. A harvesting header 16 carried by the chassis 12 is used to gather crop and to conduct the crop material to a feederhouse 18 and then to a beater in the combine 10. The beater guides the crop upward to a threshing and separating system 20, which is configured to separate grain from material other than grain (MOG), and deliver the grain to a grain tank 28 carried by the combine 10. The operation of the combine 10 is controlled from an operator cab 30.

Figure 2:
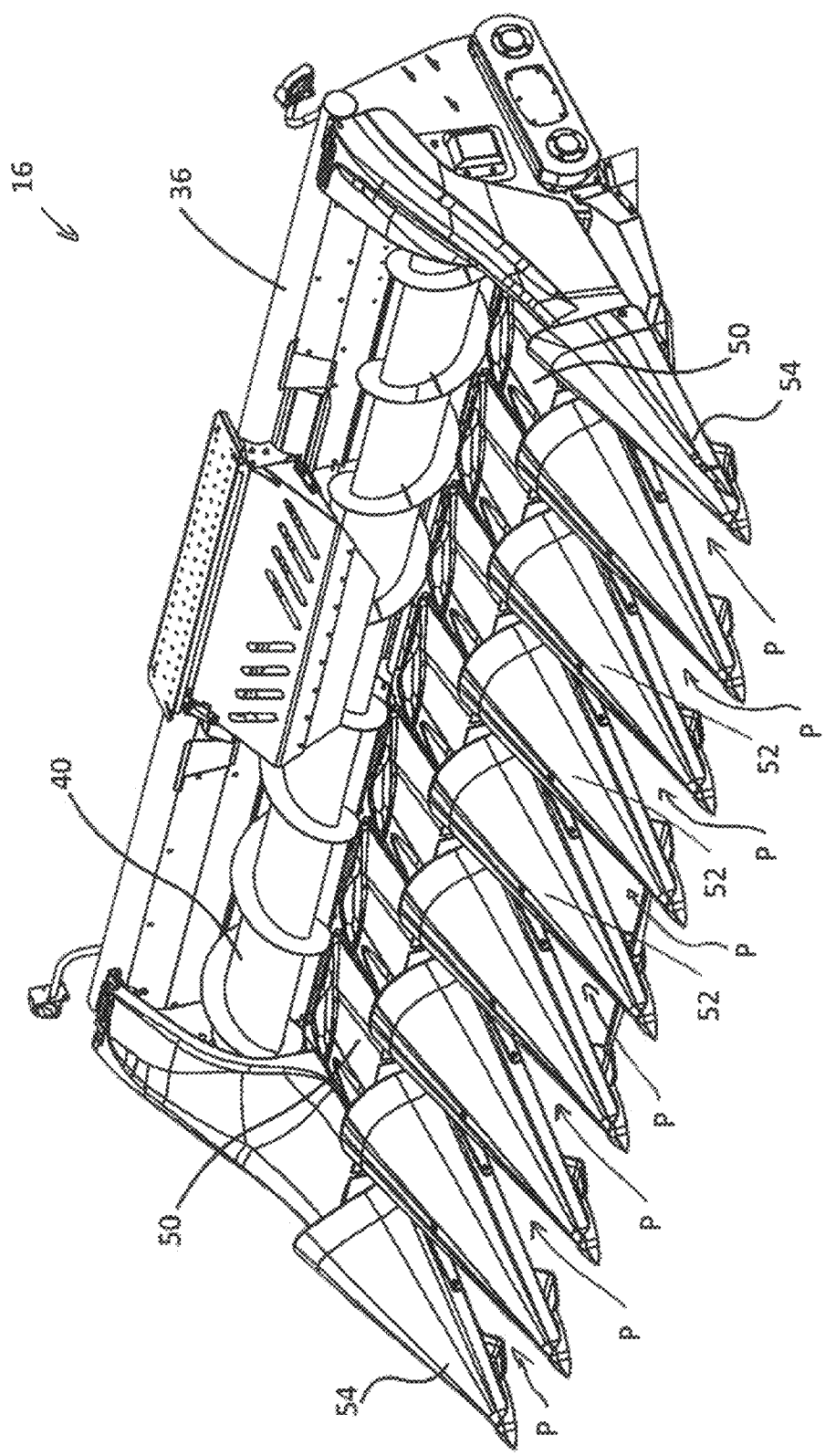
FIG. 2 is a simplified perspective view of a corn header that may be used with the combine harvester of FIG. 1.

FIG. 2 is a simplified perspective view of the harvesting header 16, which is a corn header. The illustrated corn header includes a header frame 36 carrying an auger 40 and eight row units 50. The row units 50 are separated by seven row dividers 52 and surrounded by end dividers 54. Ears of corn are stripped from each of eight crop rows planted along row paths P by the row units 50 and then carried by the auger 40 toward the feederhouse 18 of the combine Harvesting corn in a combine 10 is described generally in U.S. Pat. No. 9,322,629, "Stalk Sensor Apparatus, Systems, and Methods," issued Apr. 26, 2016; and U.S. Pat. No. 10,231,379, "Easy Mount Stalk Stomper," issued Mar. 19, 2019.

Figure 3:
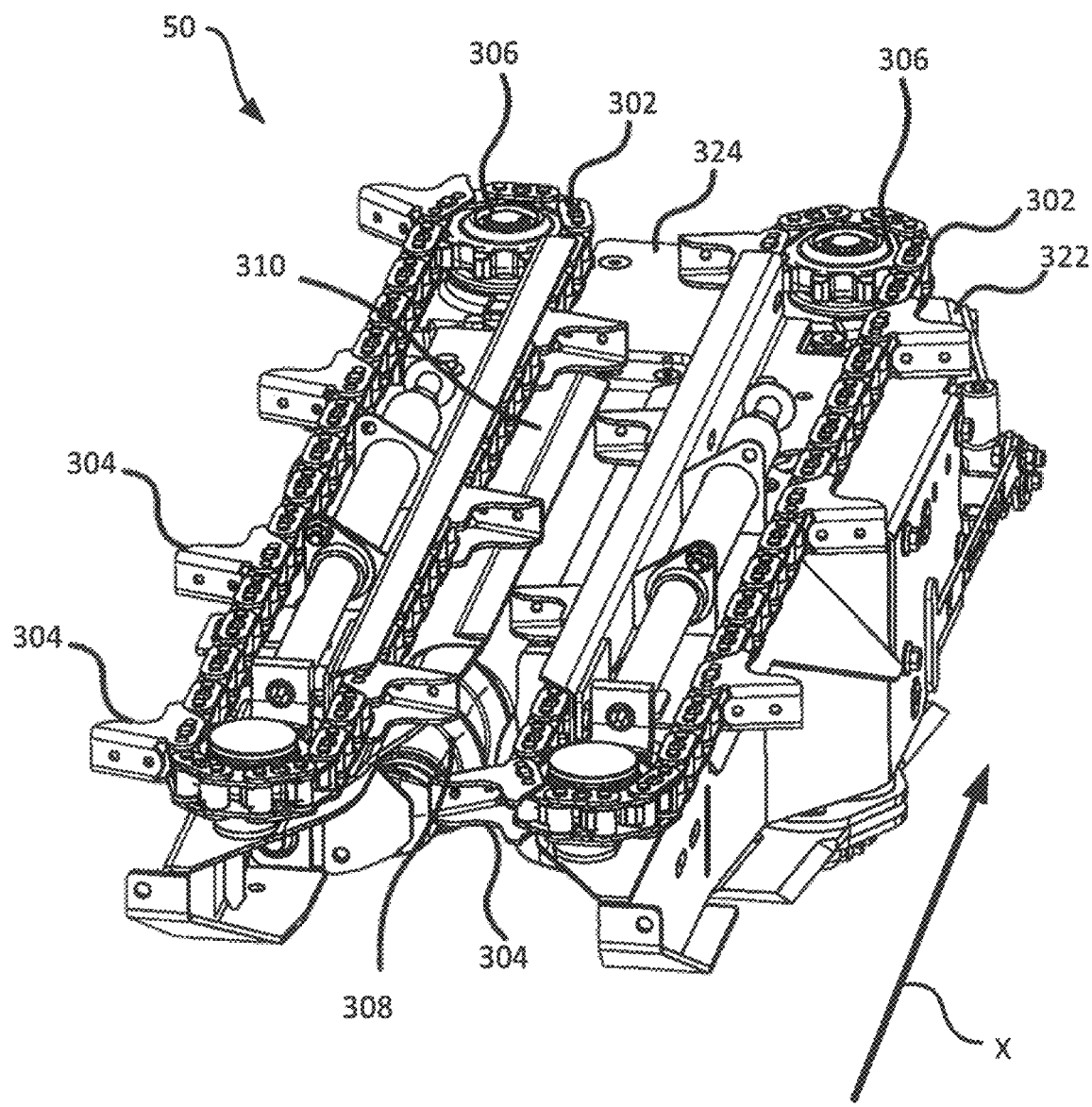
FIG. 3 is a simplified perspective view of one row unit of the corn header shown in FIG. 2.
Figure 4:
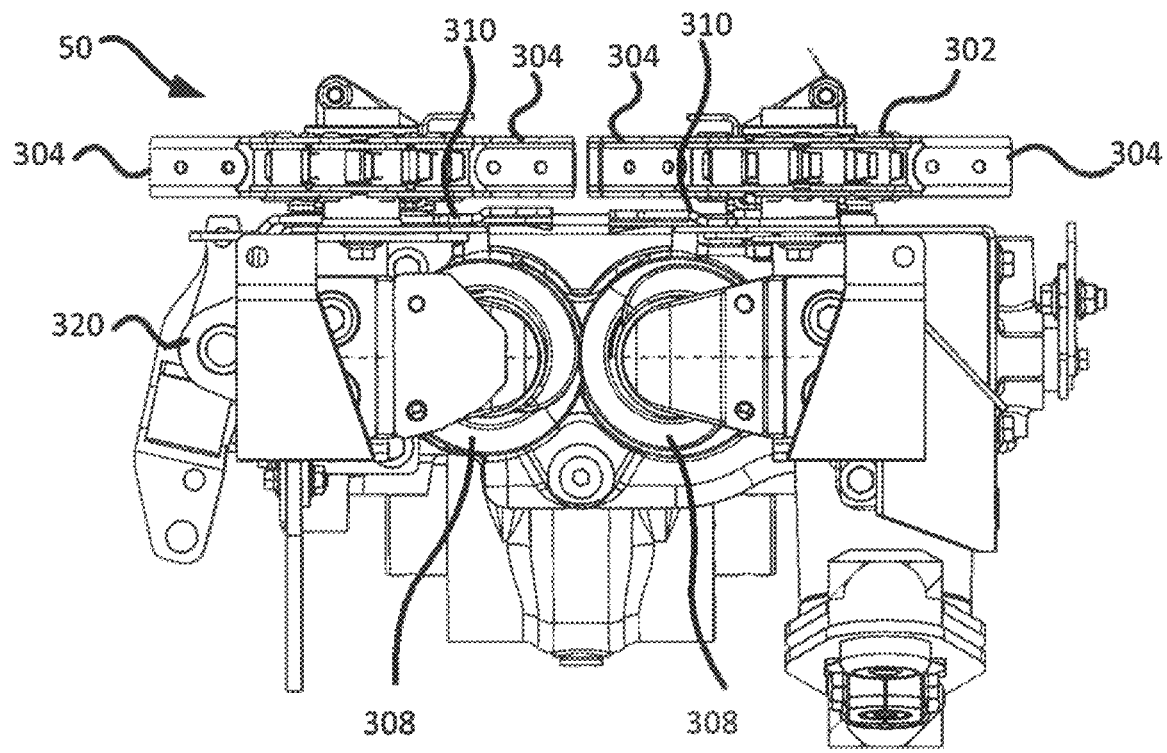
FIG. 4 is a simplified front view of the row unit shown in FIG. 3.

FIG. 3 is a simplified perspective view of one row unit 50. FIG. 4 is a simplified front view of the row unit 50. The row unit 50 includes a pair of gathering chains 302 that each carry a plurality of lugs 304. The gathering chains 302 are driven by rotation of one or more sprockets 306 coupled to a gearbox 322. As the gathering chains 302 travel, the lugs 304 travel along paths parallel to a direction indicated by arrow X between the two gathering chains 302. As the combine 10 advances in a corn field generally in the direction opposite the arrow X, the lugs 304 engage corn stalks and urge them in the direction of arrow X, toward the auger 86 (FIG. 2).

The row unit 50 also includes a pair of rotatable stalk rolls 308 below the gathering chains 302. The stalk rolls 308 are oriented generally parallel to the direction of arrow X, and may be rotated by another gearbox 324 (which may optionally be coupled to the gearbox 322 driving the gathering chains 302). The stalk rolls 308 may include vanes or other features to engage the corn stalks, as described in U.S. Pat. No. 8,646,250, "Combination Driven and Idler Snap Rolls for Corn Header," issued Feb. 11, 2014. As the gathering chains 302 urge stalks rearward, the stalk rolls 308 pull the stalks downward.

The row unit 50 also includes a pair of deck plates 310 between the gathering chains 302 and the stalk rolls 308. The deck plates 310 are shown separately in FIG. 5 in a perspective view and in FIG. 6 in a front view.

Figure 5:
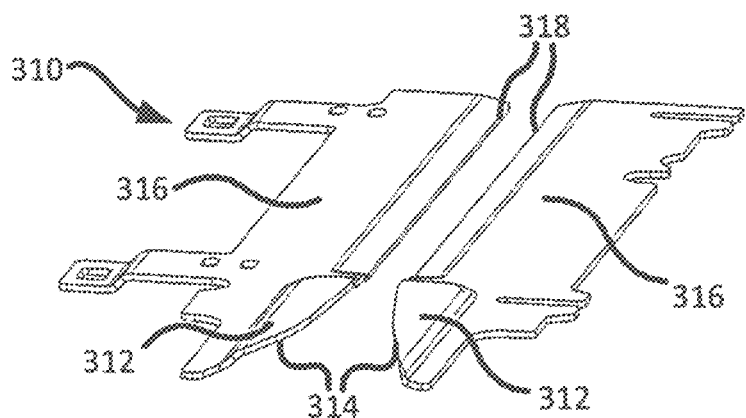
FIG. 5 is a simplified perspective view of deck plates of the row unit shown in FIG. 3.
Figure 6:
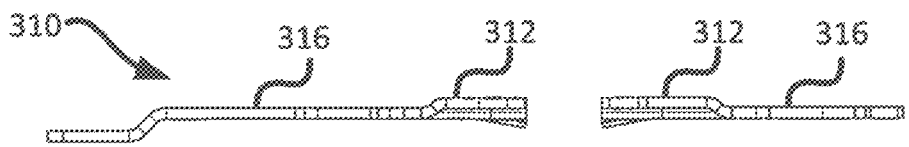
FIG. 6 is a simplified front view of the deck plates shown in FIG. 5.

As is visible in FIG. 5, the deck plates 310 may each have a first portion 312 defining a curved front edge 314 and a second portion 316 defining a straight inner edge 318. The first portion 312 of each deck plate 310 is raised with respect to the second portion 316 of the deck plate 310. Together, the inner edges 318 of the deck plates 310 define an elongate channel through which the corn stalks are driven by the lugs 304 of the gathering chains 302. The front edges 314 of the deck plates 310 form a tapered or converging lead-in area to direct the corn stalks into the elongate channel. As the stalk rolls 308 pull the corn stalks downward, ears of corn attached to the corn stalks may hit the deck plates 310, and may separate from the corn stalks. The ears may remain generally above the row unit 50, and may pass to the auger 86, to the trough 82, to the feederhouse 18, and then to the combine 10 (FIG. 2). Separation of ears from corn stalks using stalk rolls 308 is described in more detail in previously referenced U.S. Pat. No. 8,646,250.

In some embodiments, and as depicted in FIG. 5, the second portions 316 of the deck plates 310 may be angled downward toward the stalk rolls 308. In other embodiments, the second portions 316 of the deck plates 310 may be substantially planar all the way to the inner edges 318.

The deck plates 310 may be configured such that one or both are laterally adjustable to change the width of the elongate channel. For example, the deck plate 310 shown on the left may be coupled to an actuator 320, as shown in FIG. 4, which may be controlled by an operator of the combine 10. In other embodiments, the deck plate 310 on the left may be adjusted manually by turning one or more adjustment screws, or by any other adjustment mechanism. In still other embodiments, the deck plate 310 on the right may be adjusted instead of or in addition to the deck plate 310 on the left. The deck plates 310 may include mounting holes, slots, or other features to secure the deck plates 310 to the row unit 50 and, optionally, enable movement of one or both deck plates 310.

Figure 7:
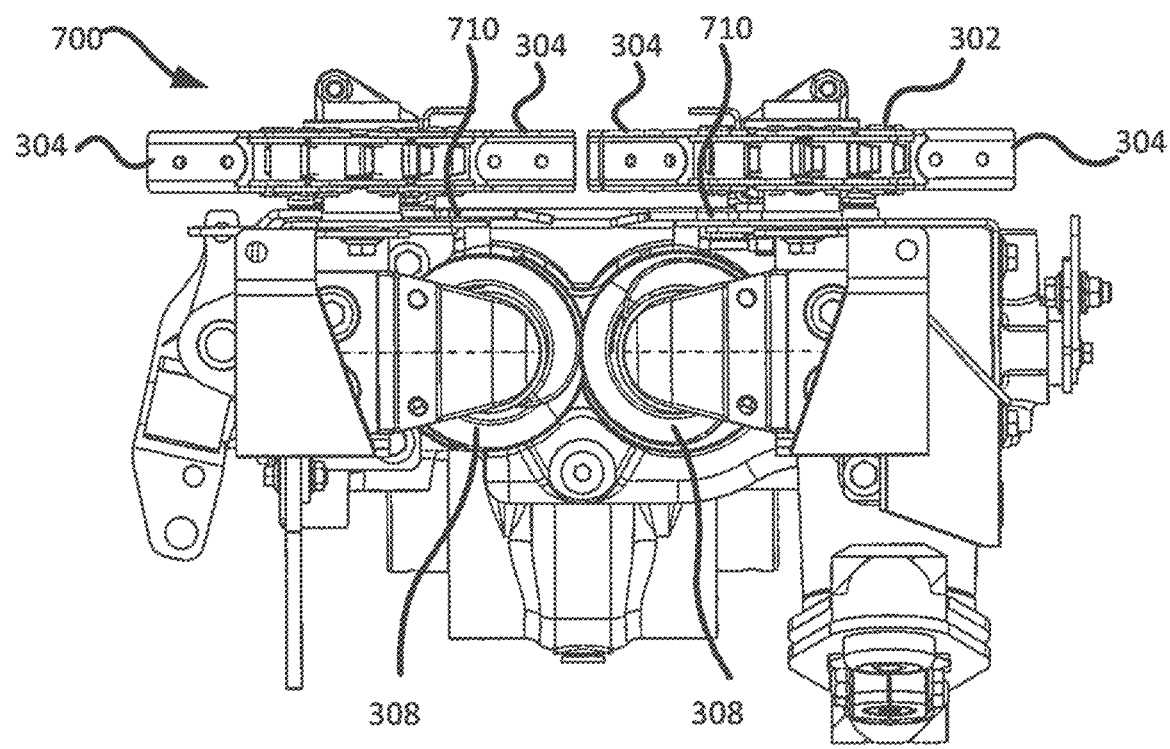
FIG. 7 is a simplified front view of a conventional row unit.
Figure 8:
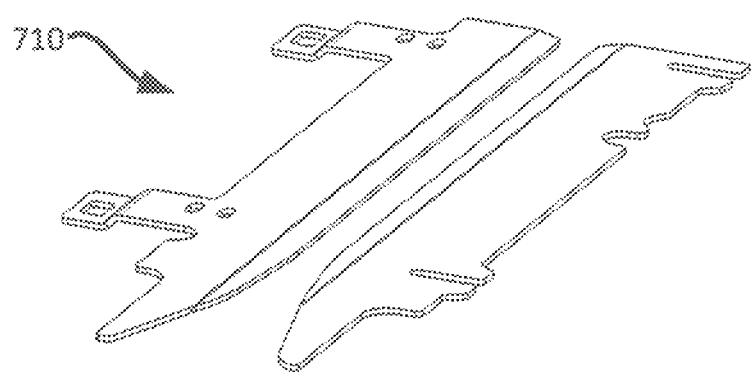
FIG. 8 is a simplified perspective view of deck plates of the row unit shown in FIG. 7.
Figure 9:
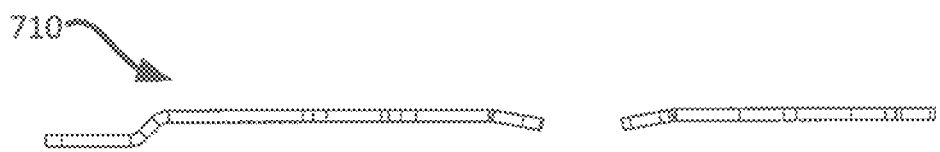
FIG. 9 is a simplified front view of the deck plates shown in FIG. 8.

The raised first portion 312 of the deck plates 310 may enable the row unit 50 to resist or avoid plugging that may occur using conventional deck plates. A row unit 700 with conventional deck plates 710 is shown in FIG. 7, with the deck plates 710 shown separately in FIGS. 8 and 9. The deck plates 710 are generally flat, and may have a slight bend along the inner edge. More detailed views of the row unit 50 and the row unit 700 are shown in FIGS. 10 and 11, respectively, and illustrate how differences between the deck plates 310 and the deck plates 710 may affect operation of the row units 50, 700.

In certain conditions, stalks can plug the entry area of the row unit 700 prior to being engaged by the stalk rolls 308. One type of plugging occurs when a gathering chain lug 304 grabs a stalk and pulls it rearward, and the stalk bends over and lodges in a gap 750 (FIG. 11) between the gathering chain lug 304 and deck plate 710, and is raked rearward. Once one stalk gets lodged in this manner, additional stalks can rapidly clog the row unit 700.

Figure 10:
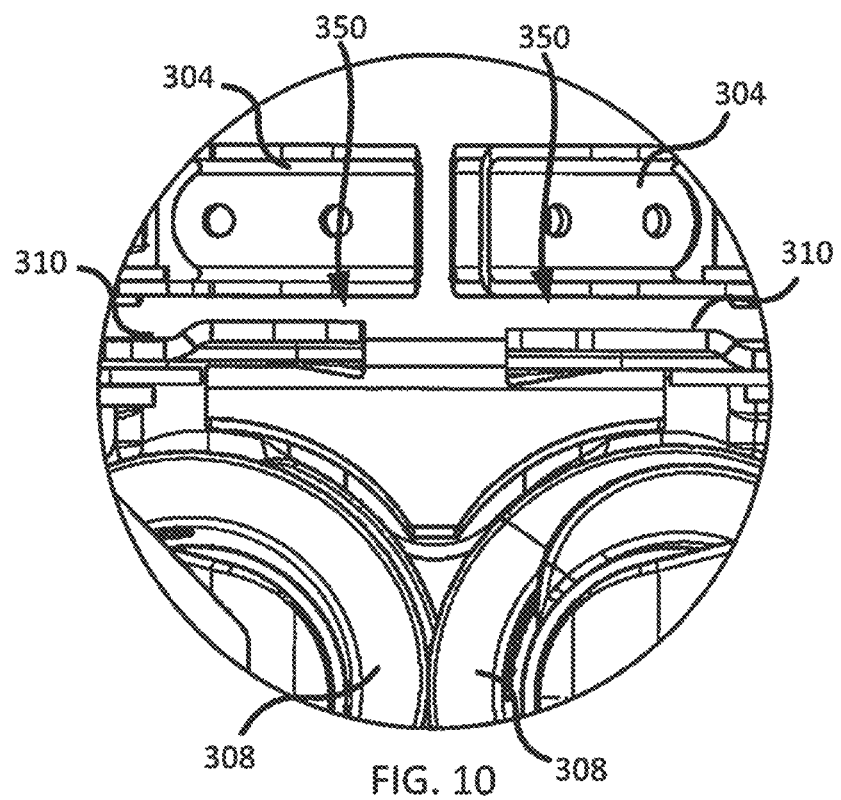
FIG. 10 is a more detailed view of the row unit shown in FIG. 3.
Figure 11:
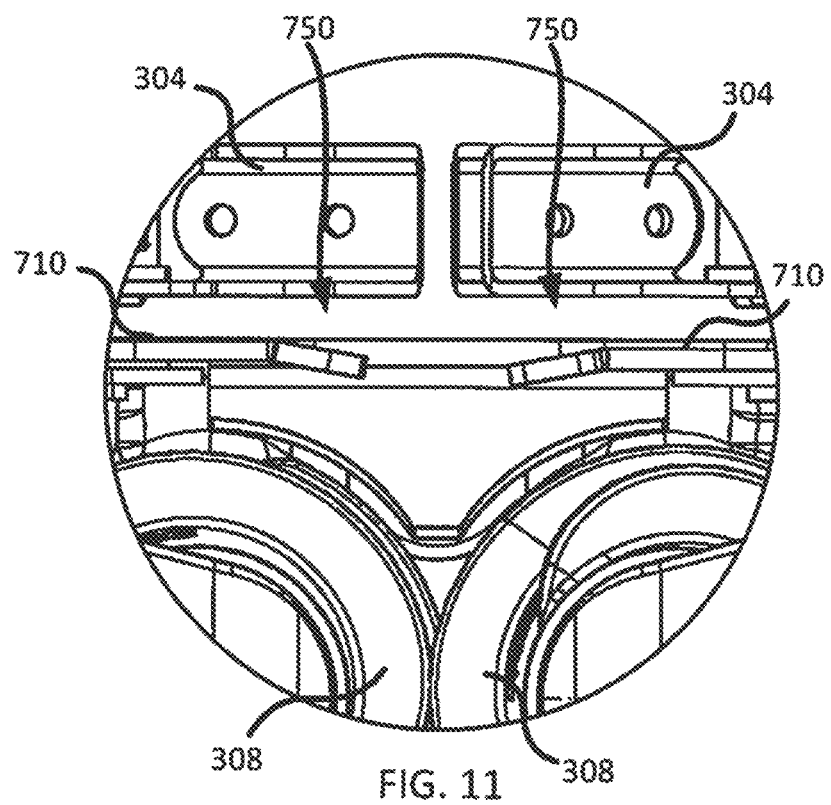
FIG. 11 is a more detailed view of the row unit shown in FIG. 7.

As shown in FIG. 10, the deck plates 310, which have a raised first portion 312 at the lead-in area, form a relatively smaller gap 350 between the gathering chain lugs 304 and the forward ends of the deck plates 310. The reduced gap 350 decreases the area in which corn stalks can be bent over and wedged between the gathering chain lugs 304 and the deck plates 310. Furthermore, the shape of the deck plates 310 may be such that the gap 350 is much smaller (e.g., shorter) than a typical diameter of corn stalks expected to be encountered in a field during harvesting. If the raised first portion 312 of the deck plates 310 are only at the front of the row unit 50, the rear second portion 316 of the deck plates 310 (the portion over the stalk rolls 308) may still function as designed, separating ears from corn stalks. However, the row unit 50 having the deck plates 310 as shown in FIGS. 4-7 and FIG. 10 may experience less plugging than conventional row units.

Additional non-limiting example embodiments of the disclosure are described below.

Embodiment 1: A row unit for a corn header, the row unit comprising a pair of gathering chains, a pair of deck plates below the gathering chains, and a pair of rotatable stalk rolls below the deck plates. Each gathering chain carries a plurality of gathering chain lugs, wherein the gathering chains are oriented such that the gathering chain lugs travel along parallel paths between the gathering chains when the gathering chains travel along paths. A first deck plate has a first portion defining a curved front edge and a second portion defining a straight inner edge, wherein the first portion of the first deck plate is raised with respect to the second portion of the first deck plate. A second deck plate has a first portion defining a curved front edge and a second portion defining a straight inner edge, wherein the first portion of the second deck plate is raised with respect to the second portion of the second deck plate. The inner edge of the first deck plate and the inner edge of the second deck plate together define an elongate channel, and the curved front edge of the first deck plate and the curved front edge of the second deck plate together define a tapered entry to the elongate channel. The stalk rolls are oriented parallel to the paths along which the gathering chain lugs travel between the gathering chains.

Embodiment 2: The row unit of Embodiment 1, further comprising a set of sprockets coupled to the gathering chains and configured to rotate to cause the gathering chains to travel along the paths, each sprocket configured to rotate about a respective axis.

Embodiment 3: The row unit of Embodiment 2, further comprising a first gearbox configured to drive at least one sprocket coupled to each gathering chain.

Embodiment 4: The row unit of any one of Embodiment 1 through Embodiment 3, further comprising a second gearbox configured to drive the pair of rotatable stalk rolls, the stalk rolls each coupled to the second gearbox at aft ends of the stalk rolls.

Embodiment 5: The row unit of any one of Embodiment 1 through Embodiment 4, wherein at least one of the first deck plate or the second deck plate is configured to be movable with respect to the other to change a width of the elongate channel.

Embodiment 6: The row unit of Embodiment 5, further comprising an actuator configured to move at least one of the first deck plate or the second deck plate.

Embodiment 7: The row unit of any one of Embodiment 1 through Embodiment 6, wherein the second portion of the first deck plate and the second portion of the second deck plate are each angled downward toward the stalk rolls.

Embodiment 8: The row unit of any one of Embodiment 1 through Embodiment 7, wherein the gathering chain lugs are configured to push corn stalks rearward through the elongate channel as the gathering chains travel along the paths, and wherein the stalk rolls are configured to pull the corn stalks downward and cause the deck plates to separate ears of corn from the corn stalks.

Embodiment 9: A harvesting header comprising a frame and a plurality of the row units of any one of Embodiment 1 through Embodiment 8 carried by the frame.

Embodiment 10: The harvesting header of Embodiment 9, further comprising a plurality of row dividers leading the row units and an auger configured to transport harvested crop to a combine harvester carrying the harvesting header.

Embodiment 11: A set of deck plates for a corn head row unit comprising a pair of gathering chains and a pair of rotatable stalk rolls, wherein each gathering chain carries a plurality of gathering chain lugs configured to travel along parallel paths between the gathering chains, and wherein the stalk rolls are oriented parallel to the paths along which the gathering chain lugs travel between the gathering chains. The set of deck plates comprises a first deck plate having a first portion defining a curved front edge and a second portion defining a straight inner edge, and a second deck plate having a first portion defining a curved front edge and a second portion defining a straight inner edge. The first portion of the first body is raised with respect to the second portion of the first body, the first portion of the second body is raised with respect to the second portion of the second body, and the curved front edges of the first and second deck plates together define a converging lead-in area and the straight inner edges of the first and second deck plates together define an elongate channel trailing the lead-in area, such that when the set of deck plates is installed in the row unit, a vertical channel is formed between the pair of gathering chains, the deck plates, and the stalk rolls.

Embodiment 12: The set of deck plates of Embodiment 11, wherein the second portion of the first deck plate and the second portion of the second deck plate are each angled downward toward the straight inner edges.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A row unit for a corn header, the row unit comprising:
   a pair of gathering chains, each gathering chain carrying a plurality of gathering chain lugs, wherein the gathering chains are oriented such that the gathering chain lugs travel along parallel paths between the gathering chains when the gathering chains travel along paths;
   a pair of deck plates below the gathering chains, the deck plates comprising:
      a first deck plate having a first portion defining a curved front edge and a second portion defining a straight inner edge, wherein the first portion of the first deck plate is raised such that the front edge is raised with respect to all portions of the first deck plate to the rear of the first portion including the second portion of the first deck plate; and
      a second deck plate having a first portion defining a curved front edge and a second portion defining a straight inner edge, wherein the first portion of the second deck plate is raised such that the front edge is raised with respect to all portions of the second deck plate to the rear of the first portion including the second portion of the second deck plate, wherein the inner edge of the first deck plate and the inner edge of the second deck plate together define an elongate channel, and wherein the curved front edge of the first deck plate and the curved front edge of the second deck plate together define a tapered entry to the elongate channel; and
   a pair of rotatable stalk rolls below the deck plates, the stalk rolls oriented parallel to the paths along which the gathering chain lugs travel between the gathering chains.

2. The row unit of claim 1, further comprising a set of sprockets coupled to the gathering chains and configured to rotate to cause the gathering chains to travel along the paths, each sprocket configured to rotate about a respective axis.

3. The row unit of claim 2, further comprising a first gearbox configured to drive at least one sprocket coupled to each gathering chain.

4. The row unit of claim 3, further comprising a second gearbox configured to drive the pair of rotatable stalk rolls, the stalk rolls each coupled to the second gearbox at aft ends of the stalk rolls.

5. The row unit of claim 1, wherein at least one of the first deck plate or the second deck plate is configured to be movable with respect to the other to change a width of the elongate channel.

6. The row unit of claim 5, further comprising an actuator configured to move at least one of the first deck plate or the second deck plate.

7. The row unit of claim 1, wherein the second portion of the first deck plate and the second portion of the second deck plate are each angled downward toward the stalk rolls.

8. The row unit of claim 1, wherein the gathering chain lugs are configured to push corn stalks rearward through the elongate channel as the gathering chains travel along the paths, and wherein the stalk rolls are configured to pull the corn stalks downward and cause the deck plates to separate ears of corn from the corn stalks.

9. The harvesting header of claim 1, further comprising:
   a plurality of row dividers leading the row units; and
   an auger configured to transport harvested crop to a combine harvester carrying the harvesting header.

10. The row unit of claim 1, wherein a gap is formed between the gathering chain lugs and the deck plate as the gathering chain lugs travel along their path, and wherein the gap is smaller above the raised first portion at the forward end of the deck plate than the gap above any portion of the deck plate behind the first portion.

11. A harvesting header, comprising:
   a frame; and
   a plurality of the row units of claim 1 carried by the frame.

12. A set of deck plates for a corn head row unit comprising a pair of gathering chains and a pair of rotatable stalk rolls, wherein each gathering chain carries a plurality of gathering chain lugs configured to travel along parallel paths between the gathering chains, and wherein the stalk rolls are oriented parallel to the paths along which the gathering chain lugs travel between the gathering chains, the set of deck plates comprising:
   a first deck plate having a first portion defining a curved front edge and a second portion defining a straight inner edge, wherein the first portion of the first deck plate is raised such that the front edge is raised with respect to all portions of the first deck plate to the rear of the first portion including the second portion of the first deck plate; and
   a second deck plate having a first portion defining a curved front edge and a second portion defining a straight inner edge, wherein the first portion of the second deck plate is raised such that the front edge is raised with respect to all portions of the second deck plate to the rear of the first portion including the second portion of the second deck plate, wherein the curved front edges of the first and second deck plates together define a converging lead-in area and the straight inner edges of the first and second deck plates together define an elongate channel trailing the lead-in area, such that when the set of deck plates is installed in the row unit, a vertical channel is formed between the pair of gathering chains, the deck plates, and the stalk rolls.

13. The deck plate assembly of claim 12, wherein the second portion of the first deck plate and the second portion of the second deck plate are each angled downward toward the straight inner edges.

14. The deck plate assembly of claim 12, wherein a gap is formed between the gathering chain lugs and the deck plate as the gathering chain lugs travel along their path, and wherein the gap is smaller above the raised first portion at the forward end of the deck plate than the gap above any portion of the deck plate behind the first portion.

* * * * *